United States Patent [19]
Gaeddert

[11] 3,785,130
[45] Jan. 15, 1974

[54] HEADER MOUNTING FOR ROW UNITS

[75] Inventor: Melvin V. Gaeddert, Newton, Kans.

[73] Assignee: Hesston Corporation, Hesston, Kans.

[22] Filed: Dec. 15, 1972

[21] Appl. No.: 315,560

[52] U.S. Cl................. 56/98, 56/15.5, 56/DIG. 9
[51] Int. Cl......................................... A01d 45/02
[58] Field of Search............... 56/15.6, 15.8, 98, 56/119, 15.5, DIG. 9

[56] References Cited
UNITED STATES PATENTS

| | | | |
|---|---|---|---|
| 2,862,345 | 12/1958 | Wigham | 56/98 |
| 3,593,507 | 7/1971 | Mohr | 56/119 |

*Primary Examiner*—Robert Peshock
*Assistant Examiner*—I. A. Oliff
*Attorney*—Gordon D. Schmidt et al.

[57] ABSTRACT

A series of spring-loaded row units are individually mounted on the header of a harvester by a hinge assembly on the cutter bar and by upper supports extending between the units and a rear frame piece of the header. The hinges have interlocking hooks which rock relatively as the row units swing up and down over uneven terrain, the hooks being of such nature as to permit relative sliding movement as the distances between the units are varied. The supports are releasably hooked at the frame piece so that the entire distance adjustment as well as unit removal and remounting may take place quickly and easily by a single operator with but a single tool to release a pair of fasteners on each unit. Adjustment of the tilt of the units is equally as rapid and easy because of the use of a hook-slot arrangement in each of the top-rear supports.

10 Claims, 6 Drawing Figures

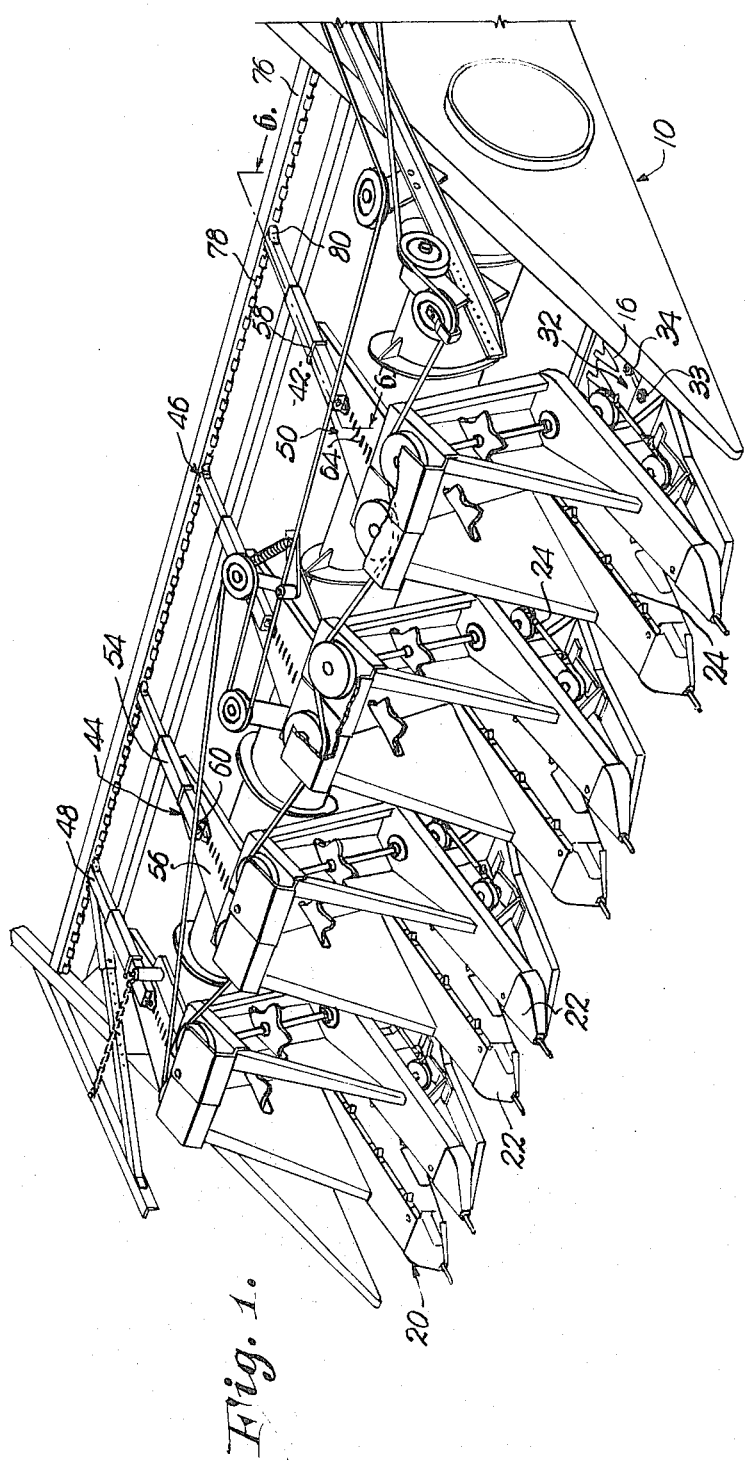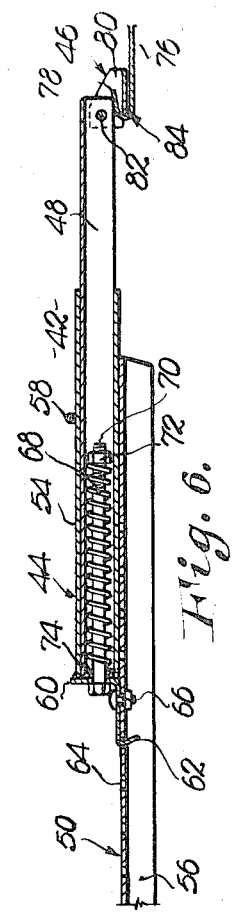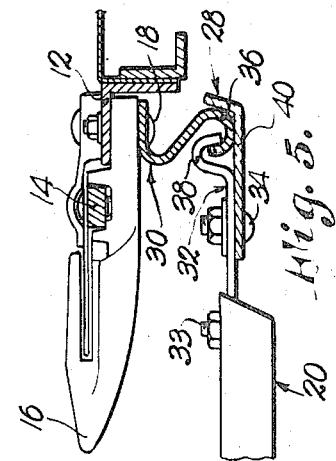

HEADER MOUNTING FOR ROW UNITS

The present invention has for its object the elimination of the time-consuming and rather difficult task experienced through use of conventional mountings in the attachment and removal of row units of the header of a field harvester. Equally as improtant is to similarly facilitate the adjustment of the distances between the units, especially in the field where the help of additional workmen may not be readily available, all for providing proper alignment of the row units with the crop rows in accordance with the distances between the latter which oftentimes vary from field to field.

In the drawings:

FIG. 1 is a fragmentary perspective view of a header for field harvesters embodying structure for mounting the row units on the header made in accordance with my present invention;

FIG. 5 is an enlarged fragmentary view showing the hinge assembly, partially in vertical section; and FIG. 6 is a fragmentary view on an enlarged scale illustrating one of the top-rear row unit supports in vertical section therethrough, taken alOng line 6—6 of FIG. 1.

Figure 2:
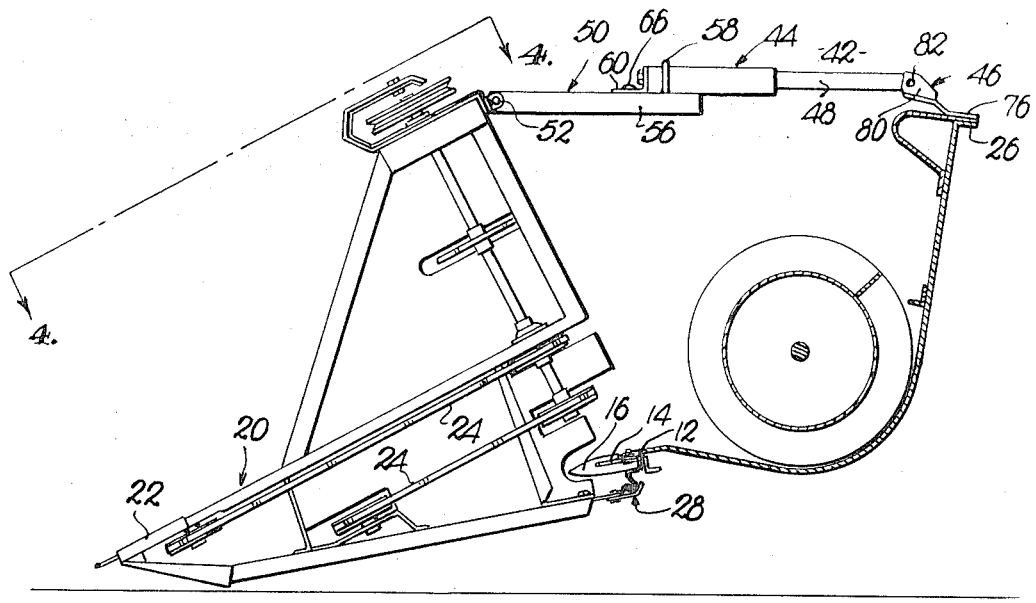
FIG. 2 is a fragmentary end elevational view of the header of FIG. 1, parts being removed for clearness.
Figure 3:
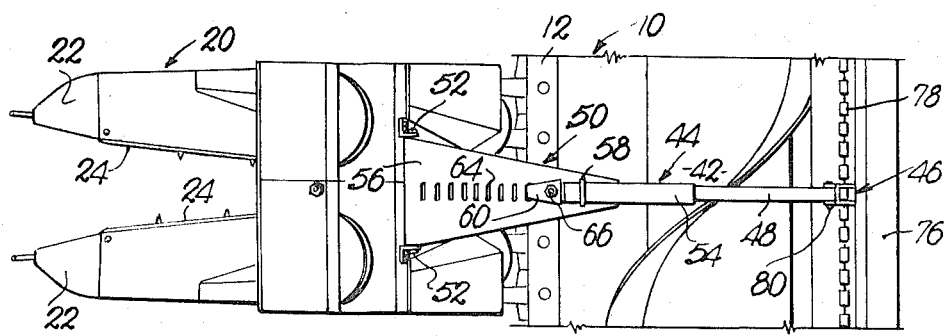
FIG. 3 is a fragmentary top plan view of the header.
Figure 4:
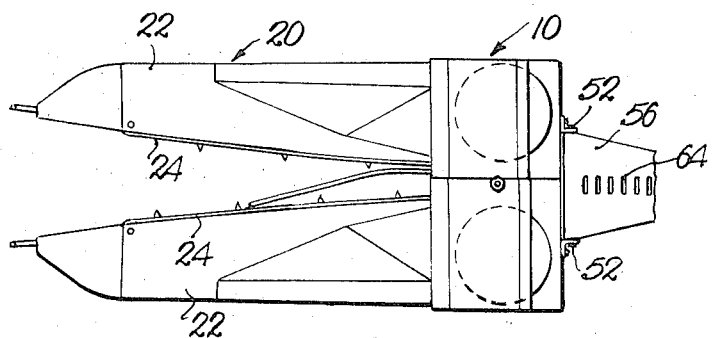
FIG. 4 is a fragmentary view similar to FIG. 3 illustrating but one of the row units, taken on line 4—4 of FIG. 2.

A row harvester header 10 is provided with a transverse cutter bar 12 having a reciprocable sickle 14 and a row of sickle guards 16 that are attached to the bar 12 by bolts 18. A series of row units 20 along the bar 12 are each provided with a pair of dividers 22 and with lugged crop gathering belts, chains or the like 24 for directing the row crops rearwardly toward the sickle 14 as the header 10 is advanced. Improved structure for mounting the units 20 on the bar 12 and on an upper transverse frame piece 26 (FIG. 2) of the header 10, disposed rearwardly of the bar 12, forms the subject matter of the present invention.

At the bar 12 there is provided a hinge assembly 28 (FIGS. 2 and 5) which interconnects the units 20 and the bar 12 for up and down swinging movement of the units 20 relative to the bar 12. The assembly 28 is provided with elongated, interconnected parts 30 and 32 that are shiftable relatively in a direction transversely of the header 10 to vary the distances between the units 20.

The part 30 is essentially S-shaped and, whether made in one piece or a number of end-to-end sections, it extends the full length of the bar 12. The generally J-shaped hinge part 32, on the other hand, is sectional, one for each unit 20 respectively. Bolts 33 secure each hinge part 32 to its unit 20 and the bolts 18 suspend the hinge part 30 from the bar 12.

Hooks 36 and 38 of the parts 30 and 32 respectively are looped together in nested relationship with the hooks 38 resting in the hook 36, and each unit 20 is provided with a pair of L-shaped backup devices 40 for the assembly 28 each releasably held in place by a bolt 34. The devices 40, looped beneath the hook 36, hold the hooks 36 and 38 interlocked while permitting free rocking movement of the hooks 38 and the devices 40 with respect to the hook 36 as the units 20 swing up and down relative to the bar 12 about the axis of the assembly 28.

At the frame piece 26 there is provided an upper attachment 42 (FIGS. 1–4 and 6) which includes a support member 44 extending rearwardly from each unit 20 respectively and a coupling 46 that pivotally secures the members 44 to the frame piece 26. Each of the members 44 has a pair of spring-loaded elements 48 and 50 (FIG. 6) that are shiftable relatively in response to swinging movement of the corresponding unit 20 about the axis of the hinge assembly 28 (FIG. 5), the elements 50 having pivotal connections 52 with the corresponding units 20.

Each element 50 has a pair of sections 54 and 56 held together by a clamp 58 and a clip 60, the latter of which is rigid to one end of the section 54. The clip 60 has a hook 62 engageable in any one of a number of slots 64 in the section 56, and a fastener 66 releasably attaches the clip 60 to the section 56 through an adjacent slot 64. The tubular section 54 is slidable on the tubular element 48 and the latter contains a spring 68 coiled about a bolt 70 between nut 72 of the latter and end wall 74 of the element 48. The bolt 70 passes through the clip 60 and the wall 74 for reciprocable movement relative to the latter.

The couplings 46 are in the nature of hook and eye arrangements which include a strip 76 that may be continuous or made of end-to-end sections secured to the frame piece 26 therealong and having a row of hooks 78. Each element 48 has a bracket 80 pivotally attached thereto by a pin 82 and each bracket 80 has a hook-receiving eye 84.

OPERATION

As the harvester is advanced along a number of crop rows each row is received between the two dividers 22 of corresponding units 20 and fed to the sickle 14 by the opposed gathering mechanisms 24. As the dividers 22 ride over uneven terrain the units 20 of the header 10 rise and fall individually, swinging at the hinge assembly 28 because of the rocking movement of the hooks 38 and the hinge locking devices 40 relative to the hook 36. During such movement of the units 20, floatingly supported by the spring 68, the members 44 swing about the pivots 52 and 80 as the sections 54 slide fore and aft along the elements 48.

The effective lengths of the members 44 may be changed by simply removing the bolts 66, loosening the clamps 58, and re-engaging the hooks 62 within a selected slot 64.

The distances between the units 20 may be varied by simply loosening the bolts 34 while leaving the hooks 36 and 38 slidably interlocked, disengaging the eyes 84 from the hooks 78 and shifting the units 20 laterally as the hooks 38 and the devices 40 slide along the hook 36. This entire adjustment may take place quickly and easily in the field by a single operator without removing the units 20 from the header 10 and with use of but a single wrench for a few bolts 34. Moreover, the adjustments are substantially infinite, limited only by the distances between the hooks 78. Still further, one or more units 20 may be quickly and easily removed entirely by releasing the devices 40 sufficiently to permit disengagement of the hooks 38 from the hook 36 and unhooking the members 44 from the strip 76.

Having thus described the invention, what is claimed as new and desired to be secured by Letters Patent is:

1. In a row harvester, a header provided with a transverse cutter bar, an upper transverse frame piece disposed rearwardly of the cutter bar, a series of row units along the cutter bar each provided with crop gathering and divider means, and structure for mounting said units on the cutter bar and on the frame piece, said structure comprising:

a hinge assembly interconnecting said units and said cutter bar for up-and-down swinging movement of the units relative to the cutter bar; and an upper attachment including a support member extending rearwardly from the upper end of each unit respectively, and a coupling pivotally securing the members to said frame piece, each member having spring-loaded elements shiftable relatively in response to said swinging movement of its corresponding unit, said hinge assembly and said coupling each having interconnected parts shiftable relatively transversely of the header for varying the distances between the units, with said parts of the hinge assembly slidably interlocked during relative shifting thereof transversely of the header.

2. In a row harvester as claimed in claim 1, and a backup device for said hinge assembly releasably secured to each of said units respectively.

3. In a row harvester as claimed in claim 1, each of said parts of said hinge assembly including a hook, said hooks of the hinge assembly being looped together in nested relationship.

4. In a row harvester as claimed in claim 3, the hook of one of said parts of the hinge assembly being attached to and extending along the cutter bar, the other of said parts of the hinge assembly being a hook on each of said units respectively.

5. In a row harvester as claimed in claim 1, said parts of the coupling being a hook and eye arrangement having a plurality of eyes and a row of hooks each adapted for selective looping through one of said eyes of the coupling.

6. In a row harvester as claimed in claim 5, said row of hooks extending along the frame piece and each of the support members being provided with one of said eyes.

7. In a row harvester as claimed in claim 4, said parts of the coupling being a hook and eye arrangement having a plurality of eyes and a row of hooks each adapted for selective looping through one of said eyes of the coupling, said row of hooks extending along the frame piece and each of the support members being provided with one of said eyes.

8. In a row harvester as claimed in claim 7, and a backup device for said hinge assembly releasably secured to each of said units respectively.

9. In a row harvester as claimed in claim 1, one of said elements of each member being provided with a hook and the other of said elements of each member having a row of hook-receiving slots for varying the effective lengths of said members.

10. In a row harvester as claimed in claim 8, one of said elements of each member being provided with a hook and the other of said elements of each member having a row of hook-receiving slots for varying the effective lengths of said members.

* * * * *